United States Patent [19]

McJones

[11] 3,823,734

[45] July 16, 1974

[54] AREA RATIO EXCESS FLOW SHUTOFF VALVE SYSTEM

[76] Inventor: Robert W. McJones, 529-Via Del Monte, Palos Verdes Estates, Calif. 90274

[22] Filed: May 21, 1973

[21] Appl. No.: 362,213

[52] U.S. Cl. .................. 137/498, 137/501, 137/503
[51] Int. Cl. ............................................ F16k 31/36
[58] Field of Search ........... 137/494, 496, 498, 500, 137/501, 503, 509

[56] References Cited
UNITED STATES PATENTS

| | | | |
|---|---|---|---|
| 2,869,397 | 12/1958 | Chenault | 137/501 X |
| 3,060,959 | 10/1962 | Foster | 137/498 |
| 3,196,901 | 7/1965 | Phillipps | 137/494 |
| 3,233,626 | 2/1966 | Hiers | 137/494 |

*Primary Examiner*—Harold W. Weakley
*Attorney, Agent, or Firm*—Christie, Parker & Hale

[57] ABSTRACT

A spool of a normally open valve has an orificed passage for gas flow from a source chamber to a control pressure chamber. The spool has an area facing control pressure which exceeds the area of the spool facing source pressure. The spool is kept in its open position during normal operation because the product of control chamber pressure and spool area seeing the control chamber and normal to the axis of the spool is maintained equal to or greater than the product of source pressure and spool area seeing source pressure and normal to the axis of the spool. Downstream from the control pressure chamber, a second orifice maintains the pressure in the control pressure chamber during normal operation at a value great enough to keep the spool control area control chamber pressure product high enough to keep the valve open. When there is a leak, however, between the valve and the second orifice, the second orifice cannot maintain a sufficiently high control pressure and the product of source pressure and spool source area will exceed the offsetting product and the spool will move to a closed position preventing gas flow through the valve. The orifice in the spool assures that there will be sufficient pressure drop between the two chambers to cause the spool to close.

11 Claims, 1 Drawing Figure

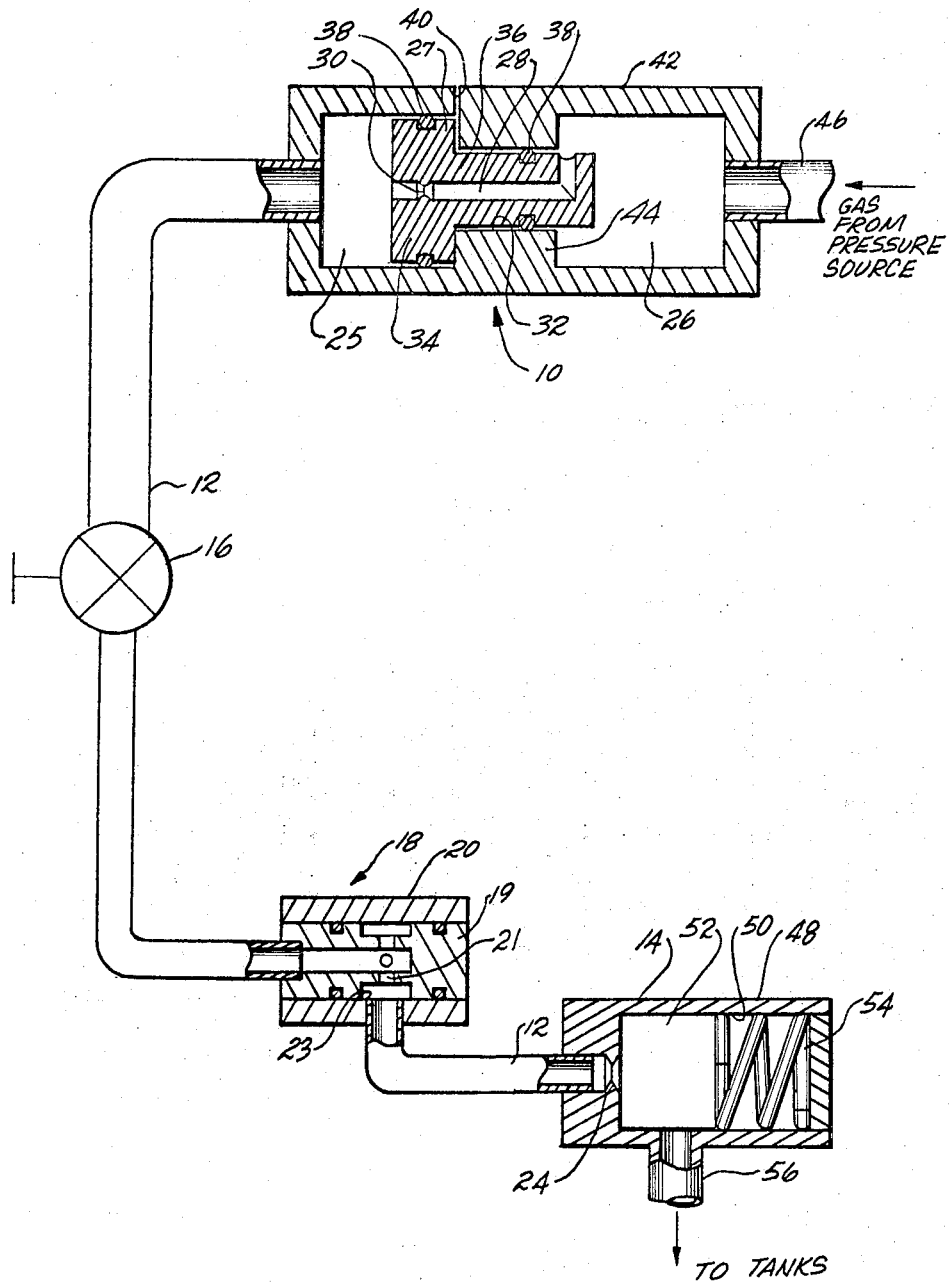

AREA RATIO EXCESS FLOW SHUTOFF VALVE SYSTEM

BACKGROUND OF THE INVENTION

The present invention relates to valves for fluids in general and, more in particular, to a valve arrangement which automatically and positively stops the flow of fluid in a system when a leak occurs.

There are many systems which require the flow of fluid under pressure from one point to another. It is common practice to provide such systems with safeguards in order to cut off the flow of fluid in the event of a leak. Valves sensitive to downstream pressure, for example, can terminate flow in a system when a leak occurs and the downstream pressure drops below some predetermined value or when the flow rate through the system exceeds some predetermined value. Alternately, an operator can turn off a control valve to prevent fluid flow into lines having leaks.

While excess flow valves are commonly used for control of liquids, they are difficult to apply in the case of a gas flowing at various pressures when the density of the gas varies.

Therefore there is a need for a simple but automatic valving system which will stop the flow of a gas under pressure when a leak occurs in the system.

SUMMARY OF THE INVENTION

The present invention provides a valving system which automatically terminates fluid flow in the system in the event that there is a sufficient decrease in the product of a pressure and an area on a valving element of a control valve over normal operating conditions. The system is particularly useful for gases.

In general, the present invention envisions the use of a control valve and an orifice at the upstream and downstream ends of a pressure system to be shut down in the event that the system develops a leak. The control valve has a valving element which has a control area acted upon by a control pressure and an opposing source area acted upon by a source pressure. Normally, the product of the control area and pressure is made equal to or greater than the product of source area and pressure to keep the valve open. The orifice on the downstream end of the system controls the pressure within the system when there are no leaks. When there is a leak, the downstream orifice will appear to become larger and the pressure ratio across the valving element will drop below the control value previously established by the downstream orifice and the valving element will close. An upstream orifice between the source and control sides of the valving element assures that there will be a pressure drop across the element when a leak occurs and that there will be a sufficient pressure ratio drop to shut the system down.

A specific and presently preferred form of the improved valving system contemplates a control valve having a body which defines a control chamber and a source chamber. The two chambers are separated by a displaceable spool. The spool has a fluid passage through it for normally communicating the source chamber with the control chamber. The upstream orifice is disposed in this fluid passage. The downstream orifice is disposed at a point in the system where the probability of a leak developing is very small. The protected portion of the system, then, is between the two orifices. The area of the spool which senses the pressure in the control pressure chamber and tends to close the spool is larger than the area of the spool which senses pressure in the source chamber and tends to close the spool. The downstream orifice, it will be recalled, maintains a pressure in the control chamber which together with the control chamber sensing area biases the spool to its open position. The ratio of areas of the spool sensitive to control and source pressure and the ratio of source and control pressures is such that under normal flow conditions the spool will be maintained in an open position, that is, with its fluid passage communicating the two chambers. When the pressure in the control chamber drops below a predetermined value, however, as determined by a leak in the system between the two orifices and the upstream orifice in the spool's passage, the force owing to pressure and area on the source side of the spool will exceed the counteracting force on the control side of the spool and the spool will move to close the passage from the source chamber. If desired, a vent port leading into the control chamber, but normally out of communication with it because of the spool, may be provided to prevent a vacuum created by movement of the spool which would tend to retard its movement.

These and other features, aspects and advantages of the present invention will become more apparent from the following description, appended claims and drawing.

DESCRIPTION OF THE FIGURE

The single FIGURE depicts, somewhat schematically, a preferred form of the area ratio excess flow shutoff valve and system of the present invention.

DESCRIPTION OF THE PREFERRED EMBODIMENT

In the FIGURE, an area ratio, excess flow, shutoff valve 10 is in series fluid circuit through a line 12 with a fill valve 14. The purpose of the shutoff valve is to terminate gas flow beyond it in the event of a downstream leak. By way of example, the fill valve may lead to one or more tanks to be charged with compressed gas. The fill valve as such does not form a part of the present invention and is illustrated merely for the purpose of understanding a typical environment of the invention. The portion of the system in which protection is afforded is between valve 10 and valve 14. For present purposes, valve 14 may be regarded as the terminal point for gas flow. A shutoff valve 16 in line 12 selectively controls the flow of gas from valve 10 to fill valve 14. A quick disconnect fitting 18 is connected in line 12 in series between shutoff valve 16 and fill valve 14. The disconnect fitting has a plug 19 received in a sleeve 20. The plug through relatively large, equidistant passages 21 opens into an annulus 23 which in turn opens back into line 12. Typically, a leak might occur at this quick disconnect fitting. The leak might be by the inadvertent uncoupling of plug 19 from sleeve 20.

A downstream orifice 24 admits to gas flow from line 12 into fill valve 14. Orifice 24 determines the pressure in line 12 and a control chamber 25 of valve 10 when valve 16 is open and there are no leaks between the control chamber and downstream orifice 24. The orifice is the smallest passage in the system. A source chamber 26 of valve 10 is in direct communication with pressurized gas from some source, say, a compressor.

A spool 27 of valve 10 has a passage 28 extending axially from control chamber 25 and then radially of the axis of the spool to open into source chamber 26 when spool 27 is in its normally open operating position. An upstream orifice 30 is in passage 28.

The location of passage 28 and orifice 30 need not be in spool 27 for valve 10 to function properly. An alternate location for the passage and the orifice anywhere between control chamber 25 and source chamber 26 will suffice so long as communication between the two chambers is effected through the orifice during normal operation, and the spool closes communication between the chambers when the pressure in chamber 25 drops because of a downstream leak.

Spool 27 is disposed for axial movement in valve 10 in control chamber 25 and a reduced diameter bore 32 of the valve. Bore 32 opens into source chamber 26. The spool has a head 34 and a shank 36. The shank is received in bore 32 and the head is received in control chamber 25. The shank continues with a constant diameter past the end of bore 32 into source chamber 26. The end of the shank sees source chamber pressure and is acted upon by such pressure, and the spool is urged towards the control chamber as a result. The spool is urged in the opposite direction by pressure in the control chamber acting on a face of the head. The diameter of the head facing control chamber pressure exceeds the diameter of the shank facing source chamber pressure. For equilibrium of the spool in an open position $P_s A_s \leq P_c A_c$, where $P_s A_s$ is the product of source chamber pressure and shank area normal to the axis of the spool, and $P_c A_c$ is the product of control chamber pressure and head area normal to the axis of the spool. Typically, when the pressure in control chamber 25 is slightly less than in source chamber 26, spool 27 will be open and in the position illustrated with passage 28 in communication with the source chamber and the control chamber. Seal means is provided to prevent gas leakage along the walls of the chamber and bore from one chamber to another. These seal means are in the form of O-rings 38 in head 34 and shank 36. If necessary to prevent leakage from source chamber 26 into passage 28 when spool 27 is in its closed position, an additional O-ring may be provided in shank 36 between the radial opening of the passage and the end of the shank. Alternately, an O-ring can be provided in bore 32 between the radial opening of the passage and the source chamber when the spool is in its closed position.

To prevent the creation of a vacuum behind the head of the spool, which would otherwise retard its movement to its closed position, a vent port 40 extends through the valve's body between control chamber 25 and atmosphere. The vent port is out of communication with that portion of the control chamber which sees pressure in line 12 because of the O-ring in head 34.

Completing the description of valve 10, chambers 25 and 26 as well as bore 32 are all within a valve body 42. Bore 32 is more particularly defined by an annular flange 44 of body 42. Gas from a pressurized source is admitted into source chamber 26 as by a line 46.

Proceeding with the description of fill valve 14, it includes a body 48 which defines a right cylindrical chamber 50. A valving element 52 is disposed for movement within this chamber in response to pressure against it from gas leaving downstream orifice 24. A spring 54 biases the valving element into a closed position masking an outlet passage 56 of the valve. Outlet passage 56 leads to, for example, tanks to be charged.

The operation of the area ratio excess flow shutoff valve of the present invention and the structural requisites for its operation can be viewed from the following relationships. As before, let the control area of head 34 normal to the axis of spool 27 and facing control pressure be $A_c$, let the source area of the shank normal to the axis of the spool and facing source pressure be $A_s$, let the pressure in the control chamber be $P_c$, and let the pressure in the source chamber be $P_s$. Assume that the friction of O-rings 38 against the wall of chamber 25 and bore 32 is negligible. Then for the valve to remain open $P_c A_c$ must be equal to or greater than $P_s A_s$. Downstream orifice 24 has a smaller area than any other area through which gas flows in the system being protected. It is sized to establish under normal flow conditions a control pressure-area product, $P_c A_c$ equal to or greater than the opposing source pressure-area product, $P_s A_s$. For stability, the control pressure-area product is preferably made greater than the opposing product. Upstream orifice 30 may be considered in establishing the proper relationship. It must be large enough relative to the downstream orifice to pass sufficient gas to give a high enough control pressure. With $P_c A_c > P_s A_s$ valve 10 remains open. Suppose quick disconnect fitting 18 uncouples. This takes the downstream orifice out of circuit and the pressure in the control chamber drops so that the product $P_s A_s$ becomes greater than the product $P_c A_c$. Spool 27 then moves to its closed position and the system is closed down. The pressure in control chamber 25 must drop with respect to the pressure in source chamber 26 because upstream orifice 30 creates a pressure drop. The drop is sufficient to cause the spool to move to its closed position. In the closed position passage 28 is out of communication with source chamber 26. To reset the valve, it is necessary to backcharge control chamber 25 with gas at sufficient pressure to force the spool to its open position. This can be done by a bypass valve between line 46 and line 12, not shown.

Stated slightly differently, downstream orifice 24 maintains a pressure in control chamber 25 when there is no leak in line 12 sufficient to keep spool 27 in its open position. As soon as resistance to slow downstream of orifice 30 decreases when there is a leak in line 12, the pressure in control chamber 25 will drop, as assured by by a pressure drop across orifice 30, to create a closing force on spool 27 from the product of pressure in source chamber 26 and the area of the spool facing source pressure and normal to the axis of the shank.

When it is desired to charge tanks, valve 16 is opened to establish communication between valve 14 and valve 10. Gas from the pressurized source is then admitted to line 46 into a source chamber 26 where it passes through passage 28, upstream orifice 30 and into control chamber 25. From control chamber 25, the gas passes through line 12, valve 16, quick disconnect fitting 18, through downstream orifice 24 and into valve 14. The pressure of this gas against valving element 52 forces the element to the right in the FIGURE against spring 54 to open fill valve 14 to the tanks to be charged.

Thus the present invention provides a control system for pressurized gases which is highly effective in terminating gas flow between two points in a system peculiarly susceptible to leaks. The valve is simple in construction and foolproof in operation, essentially relying on area ratios of a valving element and a pair of control orifices.

What is claimed is:

1. An area ratio excess flow shutoff valve comprising:
   a. a body having a source chamber, a control chamber, means for communicating the source chamber with a source of pressurized gas, and means for communicating the control chamber with a downstream orifice;
   b. means defining a passage between the source chamber and the control chamber;
   c. means defining an upstream orifice in the passage;
   d. a valving element disposed in the body for displacement between an open position allowing fluid to flow through the passage from the source chamber to the control chamber and a closed position preventing such gas flow through the passage, the valving element having a control area exposed to pressure in the control chamber for control pressure to act against in a direction tending to displace the element into its open position, and a source area exposed to pressure in the source chamber for source pressure to act against in a direction tending to displace the element into its closed position, the area of the control area exceeding that of the source area; and
   e. the control area excess over the source area being such that pressure in the source chamber will force the valving element into its closed position only when there is a leak between the shutoff valve and the downstream orifice, the downstream orifice without a leak maintaining pressure in the control chamber sufficiently high to keep the valving element in its open position, the upstream orifice providing a pressure drop from the source chamber to the control chamber when there is a leak which is suficient to allow pressure in the source chamber to force the valving element into its closed position.

2. The shutoff valve claimed in claim 1 wherein the passage is in the valving element.

3. The shutoff valve claimed in claim 1 wherein the valving element is disposed for translation in the body and has a head in the control chamber, and a shank extending from the head towards the source chamber and disposed in a bore of the body between the two chambers.

4. The shutoff valve claimed in claim 3 wherein the passage opens into the source chamber radially of the axis of the shank and is closed to the source chamber by being within the bore when the valving element is in its closed position.

5. The shutoff valve claimed in claim 4 including means to prevent gas flow from the source chamber to the control chamber along the interface between the shank and the bore.

6. The shutoff valve claimed in claim 3 wherein the body has a vent passage between the control chamber and atmosphere and opening into the control chamber at the head, and including means to prevent communication between the vent passage on the one hand and the source chamber and the control chamber on the other.

7. An area ratio excess flow shutoff valve and system comprising:
   a. a gas circuit including a downstream orifice;
   b. a valve in the gas circuit upstream from the downstream orifice, the valve having a control chamber in series with the downstream orifice, pressure in the control chamber being maintained above a predetermined minimum by the downstream orifice, a source chamber adapted to receive a gas under pressure, a passage serially connecting the two chambers, an upstream orifice in the passage for creating a pressure drop between the two chambers, and a valving element disposed for displacement between an open position permitting gas flow through the passage and a closed position preventing such flow;
   c. the valving element having a control area disposed for pressure in the control chamber to urge the valving element into its open position, and a source area disposed for pressure in the source chamber to urge the valving element into its closed position;
   d. the control area exceeding the source area by an amount sufficient for pressure in the control chamber to maintain the valving element in its open position by pressure maintained by the downstream orifice in the control chamber; and
   e. the amount that the control area exceeds the source area being limited such that when a leak occurs between the downstream orifice and the control chamber, pressure in the source chamber will force the valving element into its closed position, the upstream orifice assuring, when a leak occurs, a sufficient drop in pressure in the control chamber for the valving element to close.

8. The area ratio excess flow shutoff valve and system claimed in claim 7 wherein the valving element is disposed for translation between its open and closed position, and the passage is in the valving element.

9. The area ratio excess flow shutoff valve and system claimed in claim 8 wherein the valve has a body, the valving element being disposed in the body and having a head in the control chamber and a shank of smaller diameter than the head, the shank being in a bore of the body, the head having the control area and the shank having the source area.

10. The area ratio excess flow shutoff valve and system claimed in claim 9 wherein:
    first and second seal means is provided, respectively, between the wall of the control chamber and the head and between the wall of the bore and the shank to prevent fluid passing from the control and source chambers past the seal means, and a vent passage is provided in the body between atmosphere and the area between the seal means.

11. The area ratio excess flow valve claimed in claim 10 wherein when the valving element is in its open position the shank extends into the source chamber and the passage opens into the source chamber radially of the axis of the shank, and when the valving element is in its closed position the radial opening of the passage is in the bore.

* * * * *